US011488296B2

United States Patent
Chen et al.

(10) Patent No.: US 11,488,296 B2
(45) Date of Patent: Nov. 1, 2022

(54) SLOPE STABILITY VISUALISATION

(71) Applicant: GROUNDPROBE PTY LTD, Windsor Qld (AU)

(72) Inventors: Benny Chen, Everton Park (AU); Lachlan Campbell, Wilston (AU)

(73) Assignee: GROUNDPROBE PTY LTD, Windsor Qld (AU)

( * ) Notice: Subject to any disclaimer, the term of this patent is extended or adjusted under 35 U.S.C. 154(b) by 108 days.

(21) Appl. No.: 16/754,363

(22) PCT Filed: Nov. 27, 2018

(86) PCT No.: PCT/AU2018/000233
§ 371 (c)(1),
(2) Date: Apr. 7, 2020

(87) PCT Pub. No.: WO2019/104368
PCT Pub. Date: Jun. 6, 2019

(65) Prior Publication Data
US 2020/0242748 A1  Jul. 30, 2020

(30) Foreign Application Priority Data
Nov. 28, 2017 (AU) ................................ 2017904794

(51) Int. Cl.
*G06T 7/00* (2017.01)
*G06T 7/13* (2017.01)
(Continued)

(52) U.S. Cl.
CPC .............. *G06T 7/001* (2013.01); *E21F 17/00* (2013.01); *G06T 5/50* (2013.01); *G06T 7/13* (2017.01);
(Continued)

(58) Field of Classification Search
CPC ........... G01S 17/89; G01S 17/86; G01V 8/00; G01V 8/02; G01V 8/005; G06T 11/00;
(Continued)

(56) References Cited

U.S. PATENT DOCUMENTS 5,550,937 A   8/1996 Bell et al.
7,085,418 B2  8/2006 Kaneko et al.
(Continued)

FOREIGN PATENT DOCUMENTS

| CN | 104156965 A | 11/2014 |
| WO | 02/46790 A1 | 6/2002 |
| WO | 2017/063033 A1 | 4/2017 |

OTHER PUBLICATIONS

Little, M. J., "Slope Monitoring Strategy at PPRust Open Pit Operation", In Proceedings of the International Symposium on Stability of Rock Slopes in Open Pit Mining and Civil Engineering, pp. 211-230, the South African Institute of Mining and Metallurgy, South Africa, 2006 Entire document (see particularly pp. 215-218, section 3. Prism Monitoring, section 4. Laser Monitoring).
(Continued)

*Primary Examiner* — Pinalben Patel
(74) *Attorney, Agent, or Firm* — Howard & Howard Attorneys PLLC

(57) ABSTRACT

A mine safety apparatus, and related method, that records movement data of a scene, visual images of the scene and correlates the movement data with the visual images. The apparatus comprises: a slope monitoring device that records location data in the scene and tracks the location data over time to identify movement and produce visual movement overlays; an image capture device that records a plurality of visual images of the scene from a location; and a processor that stitches the visual images into a panoramic image of the entire scene and for selected Points of Interest in the scene
(Continued)

accurately determines a coordinate so that the visual movement overlays are correctly correlated with the Points of Interest.

16 Claims, 7 Drawing Sheets

(51) Int. Cl.
    *G06T 7/246*     (2017.01)
    *E21F 17/00*     (2006.01)
    *G06T 5/50*     (2006.01)
    *G06T 11/00*     (2006.01)
    *G06V 10/25*     (2022.01)
    *G06V 20/13*     (2022.01)
    *E21C 41/26*     (2006.01)
    *G01V 8/00*     (2006.01)
    *G01V 8/02*     (2006.01)

(52) U.S. Cl.
    CPC .............. *G06T 7/248* (2017.01); *G06T 11/00* (2013.01); *G06V 10/25* (2022.01); *G06V 20/13* (2022.01); *E21C 41/26* (2013.01); *G01V 8/005* (2013.01); *G01V 8/02* (2013.01); *G06T 2207/20221* (2013.01); *G06T 2207/30108* (2013.01)

(58) Field of Classification Search
    CPC . G06T 2207/20221; G06T 2207/30108; G06T 5/50; G06T 7/248; G06T 7/13; G06T 3/4038; G06T 7/001; G06K 9/0063; G06K 9/3233; E21C 41/26; E21F 17/00; E21F 17/185
    See application file for complete search history.

(56) References Cited

U.S. PATENT DOCUMENTS

| | | | |
|---|---|---|---|
| 9,594,167 B2 | 3/2017 | Zogg et al. | |
| 10,724,861 B2* | 7/2020 | Elmouttie | G01S 13/89 |
| 2005/0012499 A1* | 1/2005 | La Rosa | E21B 47/02 |
| | | | 324/207.15 |
| 2010/0045513 A1 | 2/2010 | Pett et al. | |
| 2010/0054628 A1* | 3/2010 | Levy | H04N 1/3876 |
| | | | 382/284 |
| 2010/0194851 A1 | 8/2010 | Pasupaleti et al. | |
| 2014/0340427 A1 | 11/2014 | Baker | |
| 2016/0180535 A1 | 6/2016 | Zalmanson et al. | |
| 2016/0291147 A1 | 10/2016 | Bellett et al. | |
| 2017/0284801 A1* | 10/2017 | Vanderbeck | E21F 17/185 |
| 2018/0089852 A1* | 3/2018 | Baker | G06T 7/50 |

OTHER PUBLICATIONS

De Graff, P.J.H. et al., Slope monitoring and data visualisation state-of-the-art-advancing to Rio Tinto Iron Ore's Wine of the Future TM, Slope Stability 2013, Brisbane, Australia—P.M. Dight (ed) c 2013 Australian Centre for Geomechanics, Perth, pp. 1-12, 2013.

Adel., E. et al., "Image Stitching based on Feature Extraction Techniques: A Survey", International Journal of Computer Applications (0975-8887) vol. 99—No. 6, Aug. 2014.

International Search Report (International Application No. PCT/AU2018/000233); dated Feb. 11, 2019; 4 pages.

International Preliminary Report on Patentability (International Application No. PCT/AU2018/000233); dated Sep. 26, 2019; 6 pages.

Supplementary European Search Report, Application No. EP 18884503.6, dated Jul. 19, 2021, 13 pages.

* cited by examiner

SLOPE STABILITY VISUALISATION

CROSS-REFERENCE TO RELATED APPLICATIONS

This application is a national phase application of International Patent Application No. PCT/AU2018/000233, filed Nov. 27, 2018, which claims priority to AU Patent Application No. 2017904794, filed Nov. 28, 2017, the disclosures of which are hereby incorporated by reference in their entirety.

FIELD OF THE INVENTION

The present invention relates to the field of mining and specifically safety in mining. More particularly, the invention relates to a method and apparatus for improved visualisation of the stability of sloping landforms during mining operations to remove image distortions that may cause a User to incorrectly interpret mine images. The invention is also useful for visualisation of the stability of tunnels and buildings.

BACKGROUND TO THE INVENTION

A significant problem in open pit mining operations and civil construction is the stability of walls, such as the sloping walls of a pit. Various monitoring techniques have been described and implemented for monitoring slope stability, particularly for mining operations. A well-known technique is to use retroflecting prisms which are monitored by a laser scanner or robotic total station. The technique relies upon accurate locating of prisms which are then detected by a laser scanner to provide known reference points on the wall. Any variance from the known location is identified as wall movement. The retroreflecting prisms have the benefit of providing a strong and readily identifiable signal at a known position.

Notwithstanding the benefits of prisms they also have a number of shortcomings. Prisms can be knocked out of alignment, knocked off the wall, or otherwise fall from the wall. They can also become dirty thus reducing effectiveness. The cost of maintaining prisms to address these issues is relatively high. Even leaving aside the economic issues the safety risk of trying to replace a prism in an unstable area may be unjustifiably high. This is a particular problem since the main place that a prism is needed is often exactly the place that a prism cannot be safely located.

There are other limitations with prisms as well. For even a modest size pit the number of prisms needed may be a few hundred, which can take a significant amount of time to install and a lot of effort to maintain. The cost of a large number of prisms is also significant, in time and material costs. The same issue applies in civil construction tasks such as tunnelling.

When using prisms for slope monitoring or other monitoring tasks the monitoring identifies movement but in order to be able to take appropriate action a person needs to be able to identify on the ground where the movement is occurring. For instance, even small movement above a haul road can be dangerous if rock falls onto or into the path of vehicles on the haul road. On the other hand, small movement below the haul road may be inconsequential. Although the slope monitoring techniques are accurate to a few millimetres the current techniques for ground truthing are not sufficiently accurate to identify precisely where movement is occurring. As a result, mine working may be disrupted unnecessarily.

By "ground truthing" is meant registering the slope deformation maps produced by slope monitoring equipment with visual images of the area monitored. Preferably the visual images of the monitored area are wide angle panoramic images, but these present a particularly difficult problem for ground truthing due to photographic image distortion.

Thus, to improve safety in mining operations, photographic image distortion needs to be minimised and correlation between slope deformation maps and visual images needs to be maximised.

SUMMARY OF THE INVENTION

In one form, although it need not be the only or indeed the broadest form, the invention resides in a mine safety apparatus that records movement data of a scene, records visual images of the scene and correlates the movement data with the visual images, the apparatus comprising:

a slope monitoring device that records location data in the scene and tracks the location data over time to identify movement and produce visual movement overlays; an image capture device that records a plurality of visual images of the scene from a location;

and a processor that:

(a) stitches the plurality of visual images together to create a panoramic image of the entire scene having a panoramic image coordinate system;

(b) for a selected Point of Interest determines a coordinate of the Point of Interest in an image tile according to a visual image coordinate system;

(c) uses Image Template Matching to find the image tile in the panoramic image;

(d) converts the Point of Interest coordinate according to the visual image coordinate system in the image tile to a coordinate in the panoramic image according to the panoramic image coordinate system;

(e) displays the Point of Interest in the panoramic image coordinate system;

(f) repeats steps (b) to (e) until all Points of Interest are displayed;

(g) registers the visual movement overlays with the panoramic image coordinate system; and (h) overlays the visual movement overlays on the panoramic image so that movement is correlated with the Points of Interest.

The slope monitoring device is suitably a Slope Stability Radar or a Slope Stability Lidar.

The image capture device is suitably a camera.

The Points of Interest may be virtual prisms or real prisms.

In another form, the invention resides in a method of slope stability visualisation including the steps of:

(a) recording a plurality of visual images of a scene from a location;

(b) stitching the visual images together to create a panoramic image of the entire scene having a panoramic image coordinate system;

(c) selecting a Point Of Interest in the scene and recording an image tile of a region around the selected Point of Image from the location;

(d) determining a coordinate of the Point of Interest in the image tile according to a visual image coordinate system;

(e) using Image Template Matching to find the image tile in the panoramic image;

(f) converting the Point of Interest coordinate according to the visual image coordinate system in the image tile to a coordinate in the panoramic image according to the panoramic image coordinate system;

(g) displaying the Point of Interest in the panoramic image coordinate system; and (h) repeating steps (c) to (g) until all Points of Interest are displayed.

The method suitably includes the further step of:

(i) overlaying slope movement on or around each Point of Interest on the panoramic image so as to provide a visualisation of slope stability.

The coordinate of the Point of Interest in the image tile is suitably determined from the coordinate of the centre of the image tile.

The image tile of a region around the selected point of interest may be a visual image recorded in step (a). Alternatively, the image tile may be an image recorded at a different zoom level to the visual images of step (a).

Suitably the Points of Interests are virtual prisms or real prisms. By virtual prism is meant a location at which there is no real prism but that by virtue of the processing described below has the characteristics of real prisms for slope stability visualisation purposes.

The step of overlaying slope movement around a Point of Interest on the panoramic image is performed by aligning the Point of Interest in a slope stability deformation map with the Point of Interest in the panoramic image.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
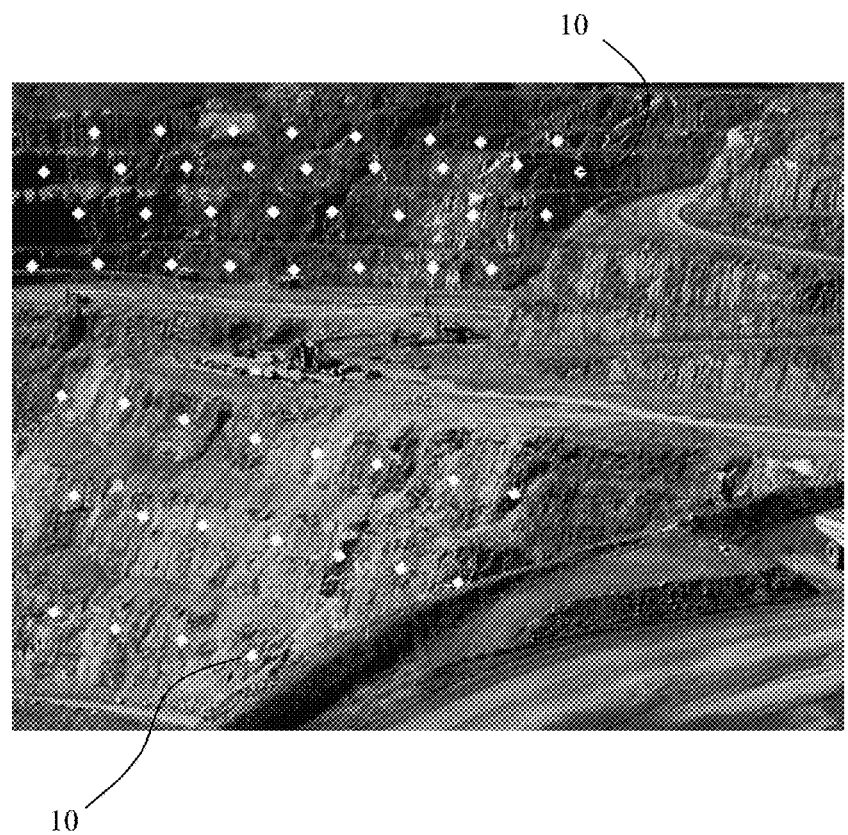
FIG. 1 is a photograph of an open cut mine showing preferred locations for prisms used in monitoring slope stability.

Embodiments of the present invention reside primarily in a method of visualizing points of interest on a slope, building or tunnel, particularly an open cut mine wall, corrected for photographic image distortion. Accordingly, the method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is a shown a photograph of a typical pit with a number of walls or slopes, any of which may present a risk of failure leading to loss of equipment and possibly injury. Overlaid on the photograph is an array of desirable prism locations, such as 10, for effective monitoring of the slope. Persons skilled in the art will understand that it is not economically feasible to deploy a large number of real prisms. It will also be appreciated that it would not be safe to locate prisms in certain parts of the slope that may be unstable, although these are exactly the parts that need to be monitored.

Figure 2:
FIG. 2 is a photograph of the open cut mine of FIG. 1 showing the location of real prisms.

FIG. 2 shows the same open cut mine with the location of real prisms indicated by diamonds. The real prisms are reflectors that return a signal to a monitoring device. By way of example, if an optical monitoring device is used, such as a laser, the real prisms will be retroreflectors. A person skilled in the art will easily determine the nature of real prism required for the monitoring device.

Figure 3:
FIG. 3 is the photograph of FIG. 2 showing the addition of virtual prisms.

The number of real prisms is less than desirable and they are not located in the ideal positions. Prisms may be lost or rendered useless by various factors including rock fall, dust build up, condensation or water build up inside the prism. The problem of not having enough prisms in the most suitable locations is addressed by providing virtual prisms, as shown by crosses 11 in FIG. 3. A virtual prism is a reflectorless measurement taken directly from the rock or other surface. It could be measured, for example, by using Slope Stability Lidar described in co-pending international publication number WO2017/063033.

To be useful the exact location of the virtual prisms must be known and therefore any image distortion will lead to inaccuracy. This is particularly a problem in wide angle images that are distorted by imaging optics. An alternate image is a panoramic image stitched together from narrower field of view images, but these too have distortions leading to incorrect determination of the coordinates of the virtual prisms. The difficulty lies in visualizing the known points of interest. A laser scanner or robotic total station registers the location of the points by measuring the angular offset and distance from the scanner. Due to photographic distortion the photographic image is not aligned to the scanner's coordinate system. The technique described below with reference to FIG. 4 obtains an accurate location for each prism on the photograph regardless of photographic image distortion. The technique applies to virtual prisms and real prisms since although the visual location of a real prism may appear accurate in the panoramic image it may not align with the scanner coordinate system. Similarly, the virtual prisms will be accurate in the coordinate system of the scanner but will not appear accurately in the panoramic image.

Figure 4:
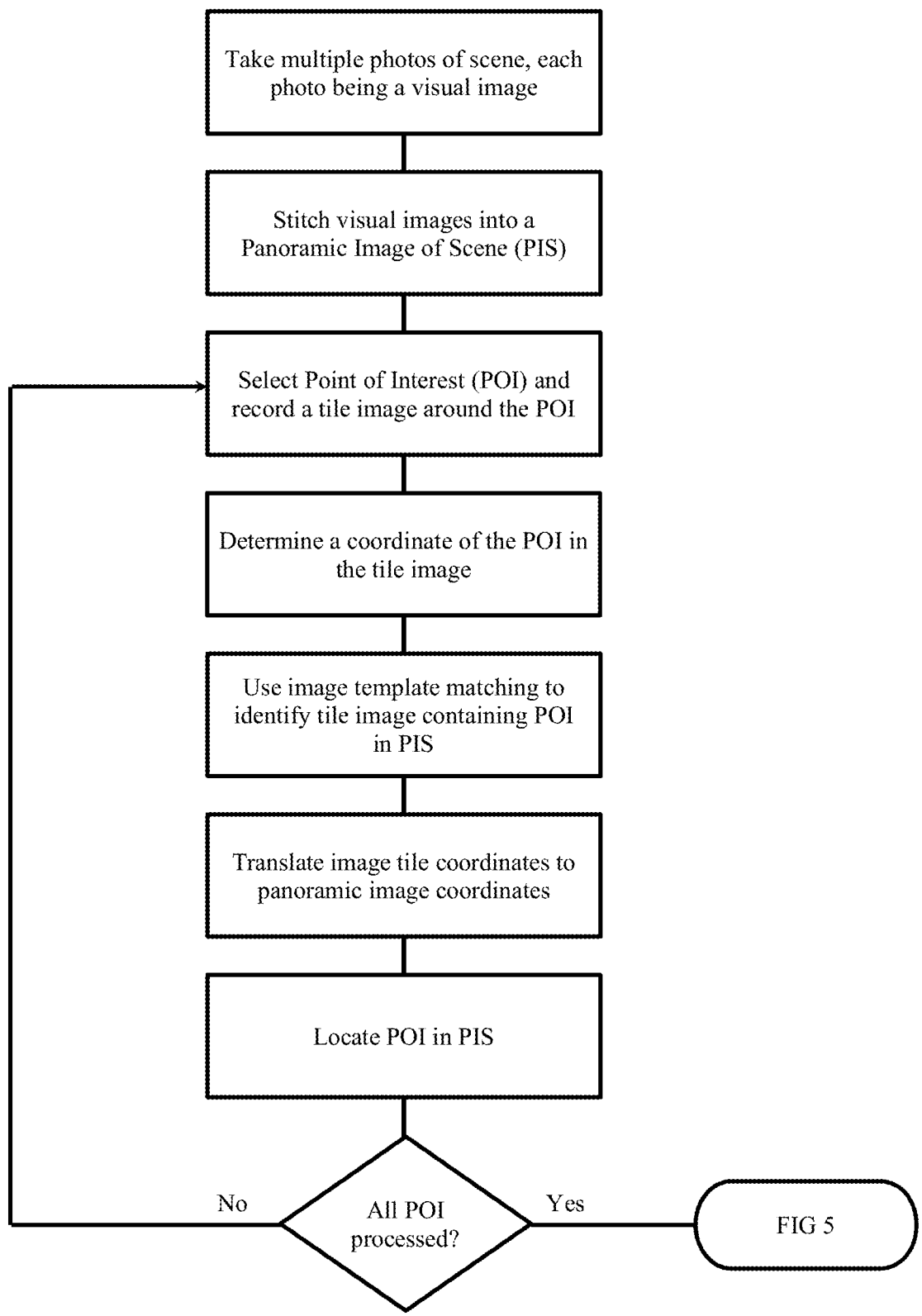
FIG. 4 is a flowchart showing the process of visualising the virtual prisms.

The flowchart of FIG. 4 sets out the steps for visualization of virtual prisms for monitoring slope stability. A number of photographs are taken of a scene covering the slope(s) to be monitored. The photographs have a limited field of view, say 33 degrees on the diagonal. Other suitable sizes may be as high a zoom as 1 degree or between 5 degrees and 45 degrees, including 10 degrees, 15 degrees, 20 degrees, 25 degrees, 30 degrees, 35 degrees, 40 degrees, or any number in between. Each photograph is taken from the same location.

Each photograph constitutes a visual image and the visual images are stitched together to form a panoramic image of the scene (PIS). Locations within the panoramic image are described by a panoramic image coordinate system, which may simply be a pixel location (eg. within a 1024×768 pixel display). Locations within the visual images that are used to form the panoramic image will be defined according to a visual image coordinate system which will be different from the panoramic image coordinate system. The visual image coordinate system may be any coordinate system that is available, such as a geodesic coordinate system or mine coordinate system. The specific coordinate system is not important except that the location of each visual image is specified according to the same coordinate system. A geodesic coordinate system may be a map system using degrees, minutes and seconds. A mine coordinate system may be a polar coordinate system using as a reference point a known location in the mine.

Each image tile has lens and sensor distortion, plus the process of stitching the visual images into the PIS necessarily causes distortion of the visual images in order to achieve a continuous appearing image from the contiguous visual images. As a result of the process the location of any particular point in the panoramic image may not be accurate according to the visual image coordinate system, although there will be a non-linear mapping from the visual image coordinate system to the panoramic image coordinate system. Unfortunately, the mapping is complex and the processing required to calculate the mapping is too time consuming to be practical. Some other technique for determining the real position of a Point of Interest in the PIS is needed.

Referring again to FIG. 4, a Point of Interest is selected in the panoramic image. This may be a readily identifiable feature or it may simply be a desirable position to construct an array of virtual prisms. Once a POI is selected an image tile that contains the POI is identified or recorded. Preferably the image tile is a photographic image of the area around the selected POI recorded at a suitable zoom level, which may be a greater zoom level than the visual images used to construct the panoramic image. However, it is also acceptable to select the original visual image that was used to construct the panoramic image. If a new image is recorded it must contain the centre of a tile in the panoramic image. The image tile must be recorded from the same location as the visual images, which will obviously be the case if the image tile is one of the visual images. Because the location of the camera is known the coordinate of the POI will be known according to the visual image coordinate system.

The coordinate of the centre of each panoramic image tile in the panoramic image coordinate system is known by virtue of the location of the camera being precisely known by surveying at the time of set up. From the centre coordinate the coordinate of the POI can be determined. An Image Template Matching process is used to find the POI image tile in the panoramic image. A mapping is then calculated between the apparent centre coordinate of the Panoramic image tile in the panoramic image and the coordinates recorded for the POI image tile in the POI coordinate system. The mapping is then used to correct the coordinate of the POI so that the POI is correctly located on the PIS.

The process may be repeated a number of times as required for the number of points of interest. Not every Point of Interest needs to be determined by this process since it will be acceptable to interpolate between POI, depending on the desired precision.

Once all the POI are determined and mapped to an accurate coordinate the POI can be used for further processing. Accurate visualization of the POI is important for understanding slope behavior.

Those skilled in the art will realise that there are many image template matching (ITM) algorithms and methods available to align two photos of various image sizes to suitably co-register two images taken from the same location. The inventors have found that a suitable algorithm uses edge detection being sharp changes in contrast, brightness, or saturation to identify sharp boundaries, patterns and features in each image then scale, rotate and slightly distort images to align the frames so that the identified boundaries match to within an acceptable margin, before applying several blending algorithms to smooth the exposures, hue, saturation, brightness and contrast channels between images to get a more consistent panoramic image.

Figure 5:
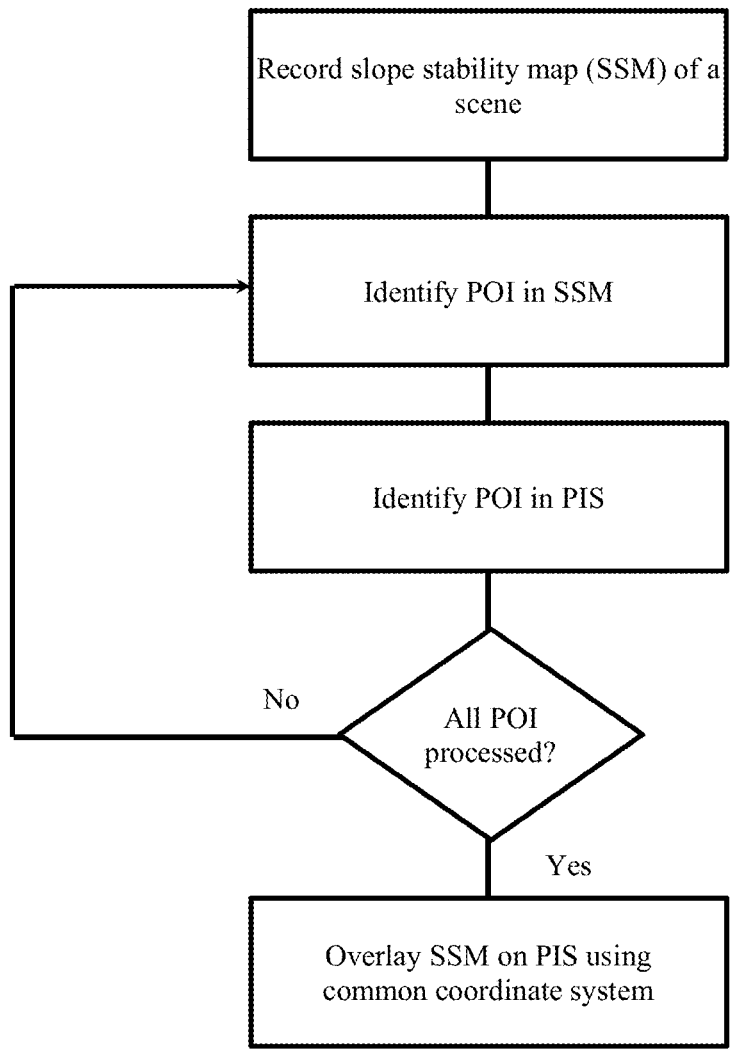
FIG. 5 is a flowchart showing the additional steps for overlaying a slope stability map on the panoramic image.

The process outlined in the flowchart of FIG. 4 is used to improve slope stability visualization as depicted in the flowchart of FIG. 5. A slope stability map (SSM) may be recorded using a number of the available slope monitoring techniques, such as those described in the Applicant's International Patent Application numbers WO2002/046790 (Slope Monitoring System) and WO2017/063033 (Slope Stability Lidar), the contents of which are incorporated herein by reference. The SSM is produced in the visual image coordinate system and corrected to the PIS coordinate system, thereby allowing overlay of the SSM on the PIS. To maximize the accuracy of the visualization a POI in the SSM, such as a location prone to significant movement, may be identified and a nearby POI, such as virtual prism, is located in the PIS. The number of selected POI may be chosen as required to achieve the desired level of accuracy. As a general comment, the more POI the greater the accuracy. There is no need to have the same number of POI in the SSM and the PIS. It is likely that multiple POI may be used around each region of interest in the SSM.

Figure 6:
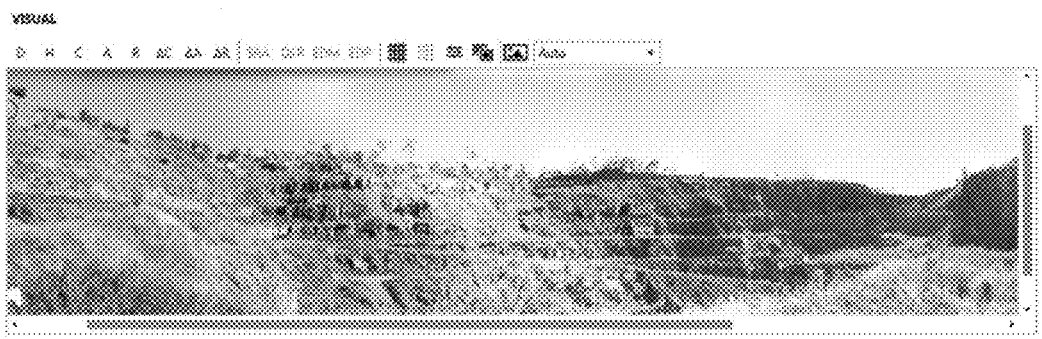
FIG. 6 is a panoramic image of a scene to be monitored.

In order to further explain the operation of the invention a panoramic image of a scene is shown in FIG. 6. The panoramic image is produced by stitching together multiple visual images, all recorded from one location. The individual images are not shown in FIG. 6 but by way of indication the panoramic image of FIG. 6 is produced from 56 visual images.

Figure 7:
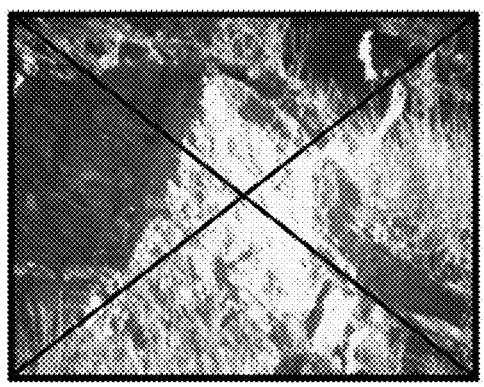
FIG. 7 is an image tile.

FIG. 7 shows an image tile that contains a particular point of interest, being the rock face in the photograph. The image tile of FIG. 7 is taken at a greater optical zoom level than the original visual images. The cross through the image depicts the centre of the image which has a known coordinate by virtue of the known location of the camera taking the photograph and recording of the azimuth and elevation at which the photograph is recorded.

Figure 8:
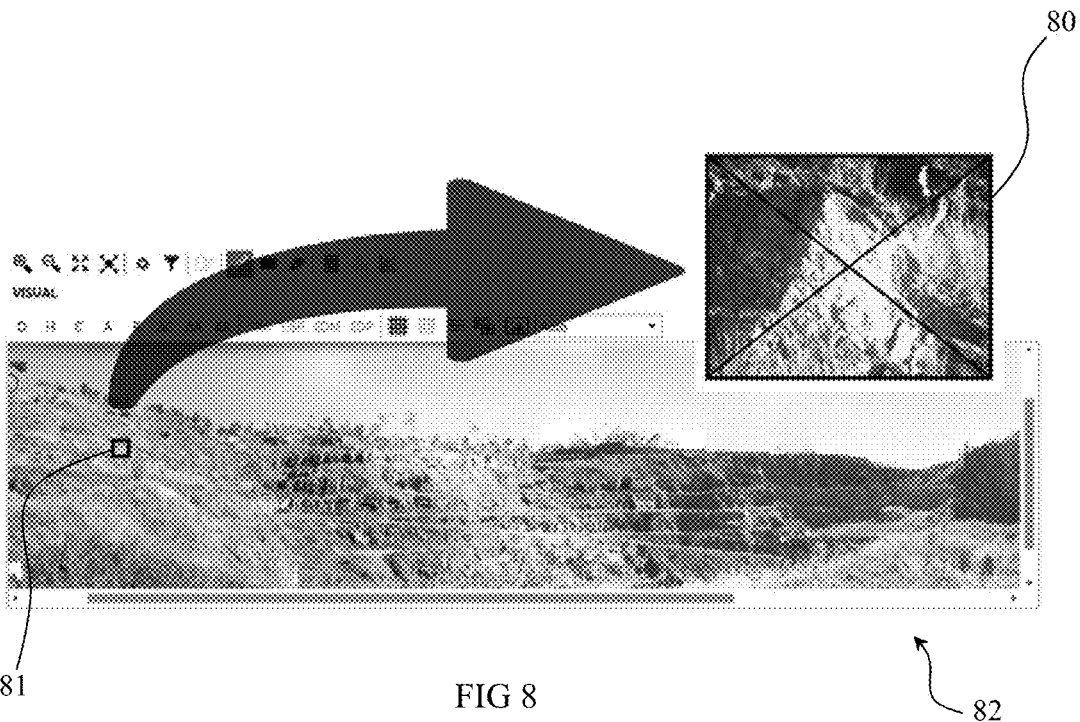
FIG. 8 depicts the location of the image tile in the panoramic image.
Figure 9A:
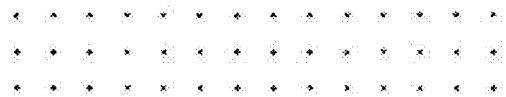
FIGS. 9a-9d show series of images depicting the operation of the invention for accurately displaying points of interest.
Figure 9B:
Figure 9C:
Figure 9D:

FIG. 8 depicts how image template matching is used to identify the image tile in the panoramic image of the scene. The location 81 of the zoomed image 80 in the panoramic image 82 is shown.

By way of further explanation, reference is made to the sequence of images of FIG. 9. FIG. 9a shows a regular array of dots which may represent virtual prisms to be applied to a panoramic image of a scene. As shown in FIG. 9b, simply overlaying the regular grid on the image produces inaccuracies in ground location because the 2D panoramic image contains distortions as explained above. Using the technique of FIG. 4 results in the array of dots being moved to match the real POI as shown in FIG. 9c. The result is that the regular array of dots of FIG. 9a is corrected to accurately represent their location in the PIS coordinates, as shown in FIG. 9d.

Figure 10:
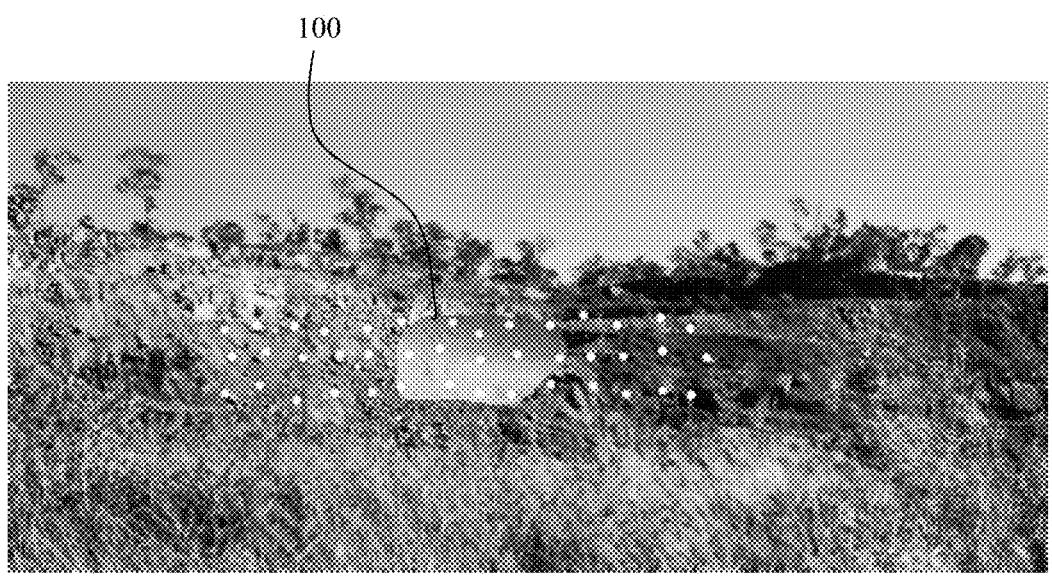
FIG. 10 shows the panoramic image of FIG. 9 with an overlaid movement map.

As explained by reference to FIG. 5, the technique allows for an accurate overlay of a slope stability map on the panoramic image. This is exemplified in FIG. 10 where a slope stability heat map 100 is overlaid on the panoramic image of FIG. 9. In practice the slope stability heat map is in colour, grading towards red to indicate greater movement. Because the virtual prisms are accurately located in the coordinate system of the panoramic image, and the slope stability map is accurately depicted in the same coordinate system, a user can clearly identify where on the ground movement is occurring and make appropriate decisions. The movement may also be depicted by colour coding of the prisms.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A mine safety apparatus that records movement data of a scene, visual images of the scene and correlates the movement data with the visual images, the apparatus comprising:
    a slope monitoring device that records location data in the scene and tracks the location data over time to identify movement and produce visual movement overlays in a visual image coordinate system;
    an image capture device that records a plurality of visual images of the scene from a location, each visual image covering only a part of the scene; and
    a processor that:
        (a) stitches the plurality of visual images together to create a panoramic image of the entire scene having a panoramic image coordinate system;
        (b) determines, for a selected Point of Interest, a coordinate of the selected Point of Interest in an image tile according to the visual image coordinate system, the image tile being a visual image or part of a visual image that contains the selected Point of Interest;
        (c) uses Image Template Matching to find the image tile in the panoramic image;
        (d) converts the Point of Interest coordinate according to the visual image coordinate system in the image tile to a coordinate in the panoramic image according to the panoramic image coordinate system;
        (e) displays the Point of Interest in the panoramic image coordinate system;
        (f) repeats steps (b) to (e) until all Points of Interest are displayed;
        (g) registers the visual movement overlays with the panoramic image coordinate system by aligning the Point of Interest in a visual movement overlay with the corresponding Point of Interest in the panoramic image; and
        (h) overlays the visual movement overlays on the panoramic image so that movement is correlated with the Points of Interest.

2. The mine safety apparatus of claim 1 wherein the slope monitoring device is a Slope Stability Radar or a Slope Stability Lidar.

3. The mine safety apparatus of claim 1 wherein the image capture device is a camera.

4. The mine safety apparatus of claim 1 wherein the processor determines the coordinate of the Point of Interest in the image tile from the coordinate of the centre of the image tile.

5. The mine safety apparatus of claim 1 wherein the Points of Interests are virtual prisms.

6. The mine safety apparatus of claim 1 wherein the Points of Interests are real prisms.

7. The mine safety apparatus of claim 1 wherein the processor registers the visual movement overlays with the panoramic image coordinate system by aligning the Point of Interest in a slope stability deformation map with the Point of Interest in the panoramic image.

8. A method of slope stability visualisation for mine safety including the steps of:
    (a) recording a plurality of visual images of a scene from a location;
    (b) stitching the visual images together to create a panoramic image of the entire scene having a panoramic image coordinate system;
    (c) selecting a Point of Interest in the scene and recording an image tile of a region around the selected Point of Interest from the location, the image tile being a visual image or part of a visual image that contains the selected Point of Interest;
    (d) determining a coordinate of the selected Point of Interest in the image tile according to a visual image coordinate system;
    (e) using Image Template Matching to find the image tile in the panoramic image;
    (f) converting the Point of Interest coordinate according to the visual image coordinate system in the image tile to a coordinate in the panoramic image according to the panoramic image coordinate system;
    (g) displaying the Point of Interest in the panoramic image coordinate system;
    (h) repeating steps (c) to (g) until all Points of Interest are displayed; and
    (i) overlaying slope movement on or around each Point of Interest on the panoramic image so as to provide a visualisation of slope stability, the slope movement being recorded in the visual image coordinate system.

9. The method of claim 8 wherein the coordinate of the Point of Interest in the image tile is determined from the coordinate of the centre of the image tile.

10. The method of claim 8 wherein the image tile of a region around the selected point of interest is a visual image recorded in step (a).

11. The method of claim 8 wherein the image tile of a region around the selected point of interest is an image recorded at a different zoom level to the visual images of step (a).

12. The method of claim 8 wherein the Points of Interests are virtual prisms.

13. The method of claim 8 wherein the Points of Interests are real prisms.

14. The method of claim 8 wherein the panoramic image coordinate system is selected from one of a geodesic coordinate system or a mine coordinate system.

15. The method of claim 8 wherein the step of overlaying slope movement around a Point of Interest on the panoramic image is performed by aligning the Point of Interest in a slope stability deformation map with the Point of Interest in the panoramic image.

16. The method of claim 8 wherein the Image Template Matching of step (e) uses an edge detection algorithm.

\* \* \* \* \*